(12) United States Patent
Susono et al.

(10) Patent No.: US 6,777,901 B2
(45) Date of Patent: Aug. 17, 2004

(54) GEAR MOTOR WITH INVERTER SUITABLE FOR REDUCING SIZE AND COST

(75) Inventors: Motohisa Susono, Fujisawa (JP); Akira Yamamoto, Ohbu (JP); Mikio Komatsu, Ohbu (JP)

(73) Assignee: Sumitomo Heavy Industries, LTD, Tokyo (JP)

( * ) Notice: Subject to any disclaimer, the term of this patent is extended or adjusted under 35 U.S.C. 154(b) by 51 days.

(21) Appl. No.: 10/237,931

(22) Filed: Sep. 10, 2002

(65) Prior Publication Data

US 2003/0048085 A1 Mar. 13, 2003

(30) Foreign Application Priority Data

Sep. 12, 2001 (JP) .................................. 2001-276248

(51) Int. Cl.[7] .................................................. H02P 7/00
(52) U.S. Cl. ..................... 318/432; 318/434; 318/798; 318/801; 180/65.1; 180/65.2; 180/65.6
(58) Field of Search .............................. 318/798–801, 318/432, 434; 180/65.1, 65.2, 65.6

(56) References Cited

U.S. PATENT DOCUMENTS

| | | | | |
|---|---|---|---|---|
| 4,965,847 A | * | 10/1990 | Jurkowski et al. | 388/814 |
| 5,463,557 A | * | 10/1995 | Nakano et al. | 700/139 |
| 5,757,153 A | * | 5/1998 | Ito et al. | 318/370 |
| 6,082,084 A | * | 7/2000 | Reimers et al. | 56/11.9 |
| 6,131,538 A | * | 10/2000 | Kanai | 123/2 |

* cited by examiner

*Primary Examiner*—Rina Duda
(74) *Attorney, Agent, or Firm*—Squire, Sanders & Dempsey L.L.P.

(57) ABSTRACT

In a gear motor with an inverter, the inverter comprises a communication circuit for communicating with a controller to control the speed of the motor under the control of the controller and a CPU for collecting information from sensors mounted on the gear of the gear motor, performing predetermined determination processing, and transmitting the collected information and the determination processing result to the controller via the communication circuit.

19 Claims, 7 Drawing Sheets

| INFORMATION TO BE DETERMINED | ALARM LEVEL | STOP LEVEL |
|---|---|---|
| PRESSURE | 0.2 kgf / cm$^2$ | 0.3 kgf / cm$^2$ |
| VIBRATION | 0.4 m / s$^2$ | 0.5 m / s$^2$ |
| TEMPERATURE | 80 °C | 90 °C |

FIG.6

GEAR MOTOR WITH INVERTER SUITABLE FOR REDUCING SIZE AND COST

BACKGROUND OF THE INVENTION

The present invention relates to a motor with a speed-control inverter (hereinafter referred to as a motor with an inverter). The present invention is particularly suitable for a gear motor with an inverter having a gear for acceleration and deceleration.

An example of a gear motor with an inverter will now be described with reference to FIG. 1. In this drawing, a gear section 1 having a gear system for acceleration and deceleration, a motor 2, an inverter 3, a plurality of sensors 4 (only one sensor is shown in this drawing for simplicity), an amplifier 5, an A/D converter 6, a communication device 7, a controller 8 such as a PLC or the like, a server 9, power wiring 10, signal wiring 11, a real-time-system network 12, an information-system network, and an internet network 14 are shown. The gear section 1 is combined into the motor 2. The sensors 4 are mounted on the gear section 1. The sensors 4 obtain monitoring information on the gear section 1, such as information on the temperature of a lubricant applied for the gear system, the magnitude of vibration of the gear system, the pressure inside the gear system, and so forth. Then, the monitoring information is amplified by the amplifier 5. The signals of the monitoring information that had been amplified by the amplifier 5 are converted into digital values by the A/D converter 6 and are input to the communication device 7. The signal wiring 11 functions as a transmission path interconnecting the sensors 4, the amplifier 5, the A/D converter 6, and the communication device 7.

The communication device 7 transmits the monitoring information to the controller 8 via the real-time-system network 12. The controller 8 can be connected to the internet network 14 via the information-system network 13 and the server 9. The controller 8 transmits the monitoring information transmitted from the communication device 7 via the Internet. Therefore, a communication terminal at a distant location can monitor the gear section 1.

The inverter 3 is connected to the motor 2 via the power wiring 10. The inverter 3 is connected to a power supply (not shown) and is connected to the controller 8 via the real-time-system network 12. The inverter 3 controls the speed of the motor 2 according to a command transmitted from the controller 8.

The real-time-system network 12 is a field network for connecting the controller 8 to various kinds of terminal devices, and is suitable for transmitting data of relatively small capacity at high speed. A network such as a Device Net, Profibus, Interbus, and so on can be used as such a network. On the other hand, the information-system network 13 is a local area network (LAN) for interconnecting controllers and servers and is capable of handling data of relatively large capacity. A network that is called an Ethernet (a registered trademark) can be used as such a network.

Incidentally, the above-described gear motor with the inverter requires a communication device specifically designed to transmit information from the various sensors.

SUMMARY OF THE INVENTION

Accordingly, an object of the present invention is to provide a gear motor with an inverter that eliminates the need for the communication device specifically designed to transmit information from the sensors thereof.

Another object of the present invention is to provide a gear motor with an inverter that can collect and process information transmitted from the sensors thereof and can detect abnormal conditions.

A gear motor with an inverter according to the present invention includes a communication circuit for communicating with a high-order device and is combined with the inverter for performing speed control under the control of the high-order device. The gear motor is further combined with a gear section for acceleration and deceleration.

According to an aspect of the present invention, the gear motor with the inverter comprises at least one of sensor mounted on the gear section. The inverter comprises a control unit for collecting information from the at least one sensor and performing predetermined processing using the collected information. The control unit transmits at least one of the collected information and the processing result to the higher-order device via the communication circuit.

The present invention can also be applied to a motor with an inverter. Such a motor with the inverter includes a communication circuit for communicating with a higher-order device and is combined with the inverter for performing speed control under the control of the higher-order device.

According to another aspect of the present invention, the motor with the inverter is provided with at least one sensor that is used except for the speed control. The inverter comprises a control unit for collecting information from the at least one sensor and performing predetermined processing by using the collected information. The control unit transmits at least one of the collected information and the processing result to the higher-order device via the communication circuit.

BRIEF DESCRIPTION OF THE DRAWINGS

FIG. 6 illustrates an example where an exemplary alarm level and an exemplary stop level are set for signals transmitted from the sensors shown in FIG. 4 for processing the gear information as shown in FIG. 5.

DESCRIPTION OF THE PREFERRED EMBODIMENTS

Figure 1:
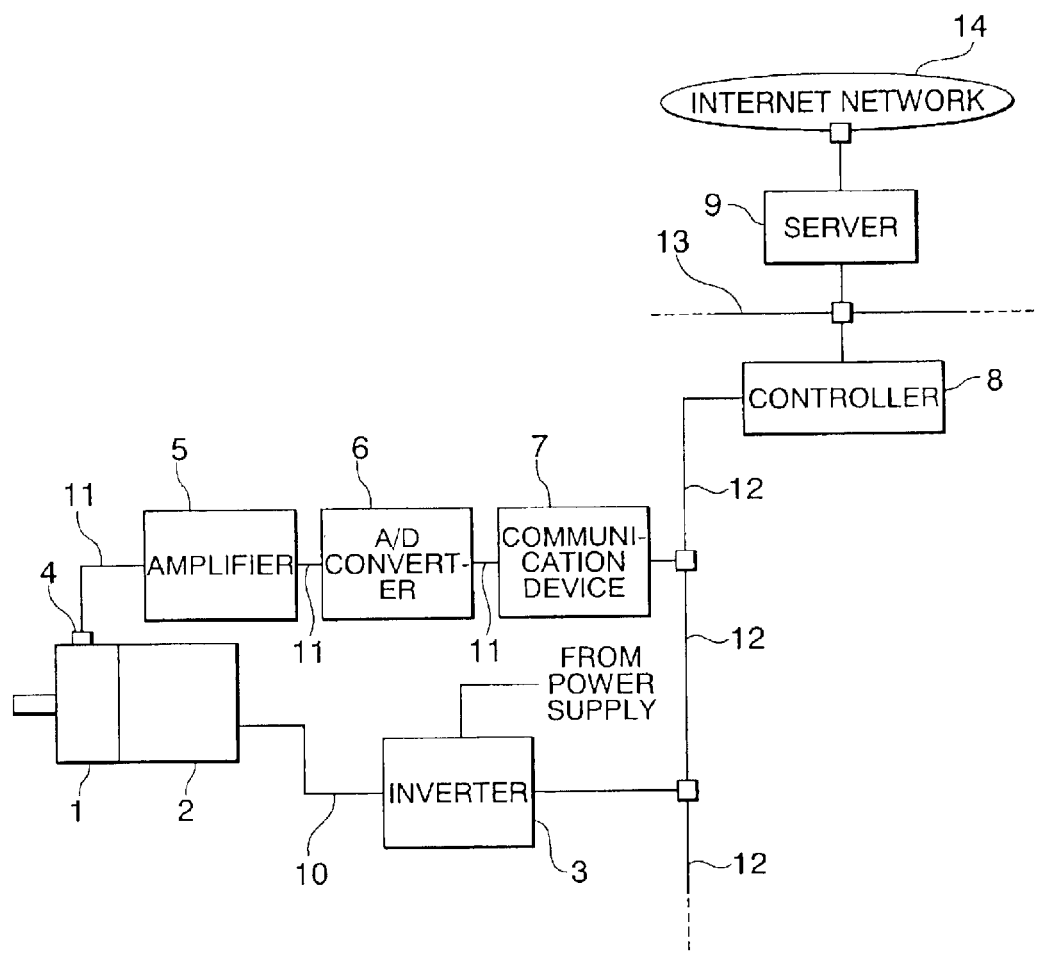
FIG. 1 illustrates the configuration of an exemplary conventional gear motor with an inverter.

The preferred embodiments of the present invention will now be described with reference to FIGS. 2 to 7. FIG. 2 illustrates the configuration of a gear motor with an inverter according to the present invention. Since the configuration of the gear motor with the inverter is similar to that of the conventional gear motor with the inverter shown in FIG. 1, like parts are designated by like reference numerals throughout the specification and the drawings.

In FIG. 2, a gear section 1, a motor 2, an inverter 30, a plurality of sensors 4, a controller 8, a server 9, signal wiring 11, real-time-system network 12, an information-system network 13, and an internet network 14 are shown. The motor 2 is combined with the gear section 1 that is provided for acceleration and deceleration, whereby the gear motor is formed. The plurality of sensors are mounted on the gear section 1 as shown in the latter part of the specification. However, only one sensor is shown in this drawing for simplicity. According to the embodiments of present invention, the inverter 30 is mounted on the motor 2. However, the inverter 30 may be placed separately.

The inverter 30 comprises a CPU (control unit) 32 for collecting information transmitted from the sensors 4 and performing predetermined processing. Subsequently, the inverter 30 can transmit at least one of the collected information and the processing result to the controller 8 via a communication circuit. The communication circuit is different from the specifically designed communication device 7 shown in FIG. 1. The difference between the communication circuit of the present invention and the communication device 7 of the conventional gear motor will be described in the latter part of the specification. The CPU 32 performs predetermined processing. First, the CPU 32 performs abnormality-determination processing for determining whether or not the motor 2 and especially the gear section 1 are under abnormal conditions based on the information transmitted from the sensors 4. In addition to the abnormality-determination processing, the CPU 32 determines whether or not the motor 2 needs to be stopped when the motor 2 is under the abnormal conditions. The CPU 32 stops the motor 2 when it determines that the motor 2 needs to be stopped.

Figure 3:
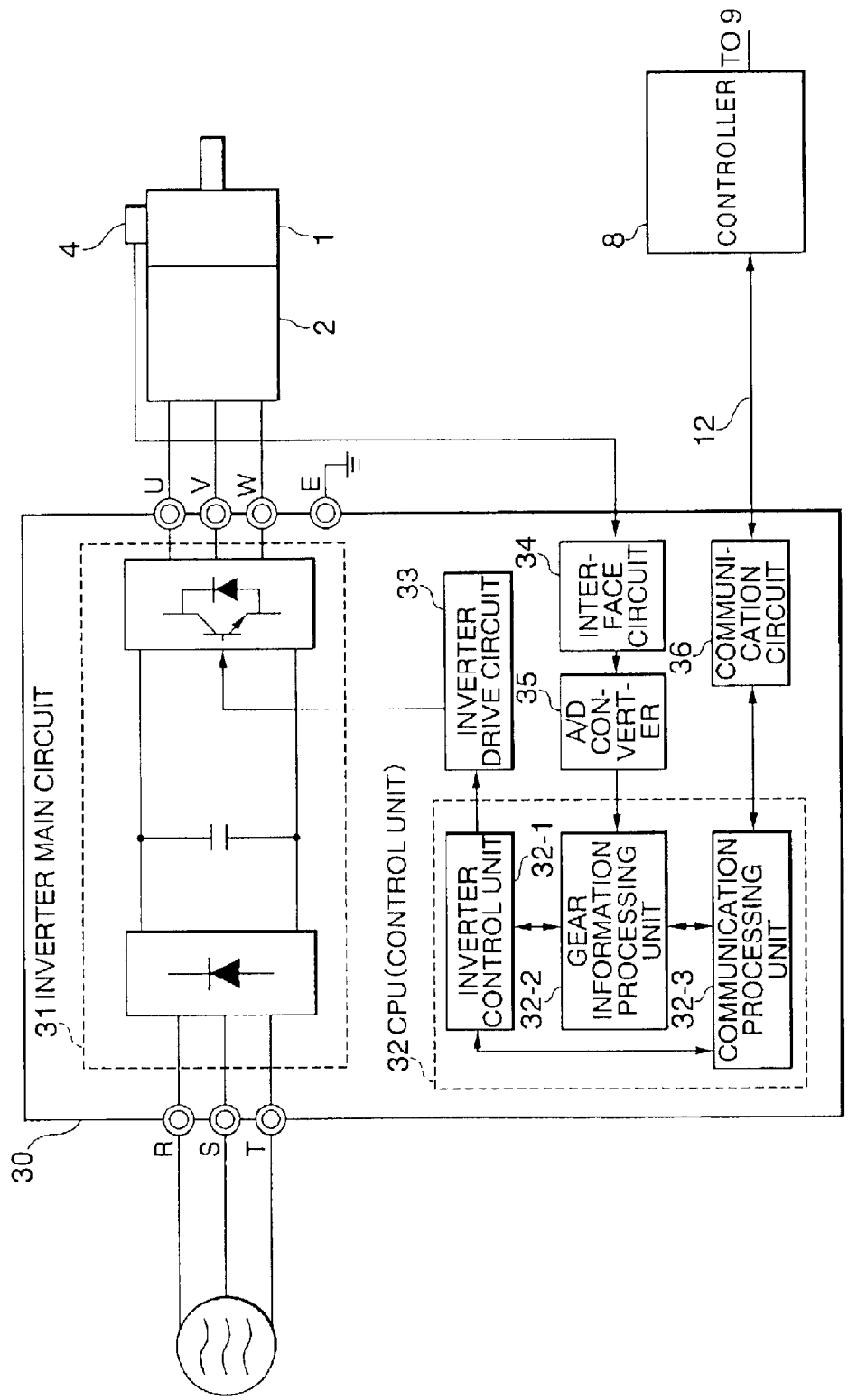
FIG. 3 is a block diagram illustrating the configuration of the inverter shown in FIG. 2.

The configuration of the inverter 30 is described with reference to FIG. 3. The inverter 30 comprises an inverter main-circuit 31, the CPU 32 including an inverter-control unit 32-1, a gear-information-processing unit 32-2, and a communication-processing unit 32-3, an inverter-drive circuit 33, an interface circuit 34, an A/D converter 35, and a communication circuit 36.

The inverter main-circuit 31 functions as an inverter. The CPU (control unit) 32 and the inverter-drive circuit 33 control a plurality of switching elements in the inverter main-circuit 31. The interface circuit 34 and the A/D converter 35 can be collectively referred to as an interface unit.

The information or signals that are transmitted from the sensors 4 are input to the A/D converter 35 via the interface circuit 34 and are converted into digital values by the A/D converter 35. The converted digital values are input to the CPU 32.

The gear-information-processing unit 32-2 receives the converted digital values. The gear-information-processing unit 32-2 determines whether or not the gear section 1 is under abnormal conditions based on the received information. The CPU 32 transmits gear information that is the determination result obtained by the gear-information-processing unit 32-2 to the controller 8 via the communication-processing unit 32-3, the communication circuit 36, and the real-time-system network 12.

When the gear-information-processing unit 32-2 determines to stop operating due to the abnormality, the gear-information-processing unit 32-2 transmits the details of the abnormal conditions to the inverter-controlling unit 32-1. Upon receiving such information, the inverter-control unit 32-1 stops the motor 2 by stopping the inverter main-circuit 31.

The communication-processing unit 32-3, the communication circuit 36, and the real-time-system network 12 are used for communication between the controller 8 and the inverter-control unit 32-1 other than the transmission of the gear information. That is to say, the communication-processing unit 32-3, the communication circuit 36, and the real-time-system network 12 receive information that is necessary for operating the inverter (an operation command, a frequency command, parameter setting, and so forth) from the controller 8. Otherwise, the communication-processing unit 32-3, the communication circuit 36, and the real-time-system network 12 transmit the information on the inverter 30 to the controller 8.

As has been described, the information on the gear section 1 is detected by the sensors 4 that are mounted thereon and is transmitted to the Internet via the real-time-system network 12, the controller 8, the information-system network 13, and the server 9. Such configuration is the same as that of the conventional gear motor with the inverter.

Figure 2:
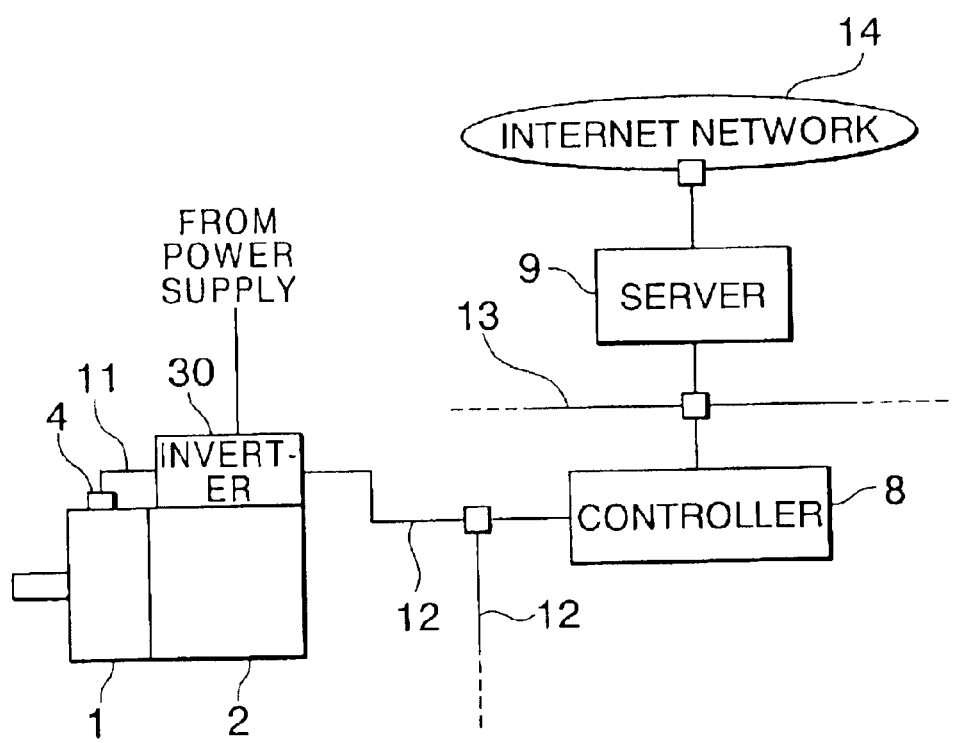
FIG. 2 illustrates the configuration of a gear motor with an inverter according to the present invention.

The difference between the gear motor with the inverter according to this embodiment and the conventional gear motor with the inverter shown in FIG. 1 is described below.

1) The inverter 30 includes an input interface of the sensors 4 that are mounted on the gear section 1. Subsequently, the amplifier 5 and the A/D converter 6 shown in FIG. 1 are eliminated.

2) The gear information can be transmitted through the real-time-system network 12 by using the communication circuit 36 included in the inverter 30. Subsequently, the communication device 7 for transmitting the gear information and the network wiring necessary therefor shown in FIG. 1 are eliminated.

3) Since the inverter 30 is mounted on the motor 2, the signal wiring 11 extending from the sensors 4 and power wiring between the motor 2 and the inverter 30 can be done before shipment as shown in FIG. 2. Incidentally, the power wiring shown in FIG. 2 corresponds to the power wiring 10 shown in FIG. 1. Subsequently, the signal wiring 11 for installing the motor 2 and the power wiring between the motor 2 and the inverter 30 become unnecessary. However, even though the inverter 30 is placed separately, the information from the gear section 1 can be transmitted to the real-time-system network 12 via the inverter 30 by providing the signal wiring 11 from the sensor 4 and the power wiring between the motor 2 and the inverter 30.

In FIG. 2, the gear section 1 is directly connected to the motor 2. However, when the gear section 1 is placed separately, the same effect can be obtained by providing the signal wiring between the sensors 4 and the inverter 30 at the time when the motor 2 is installed.

Figure 4:
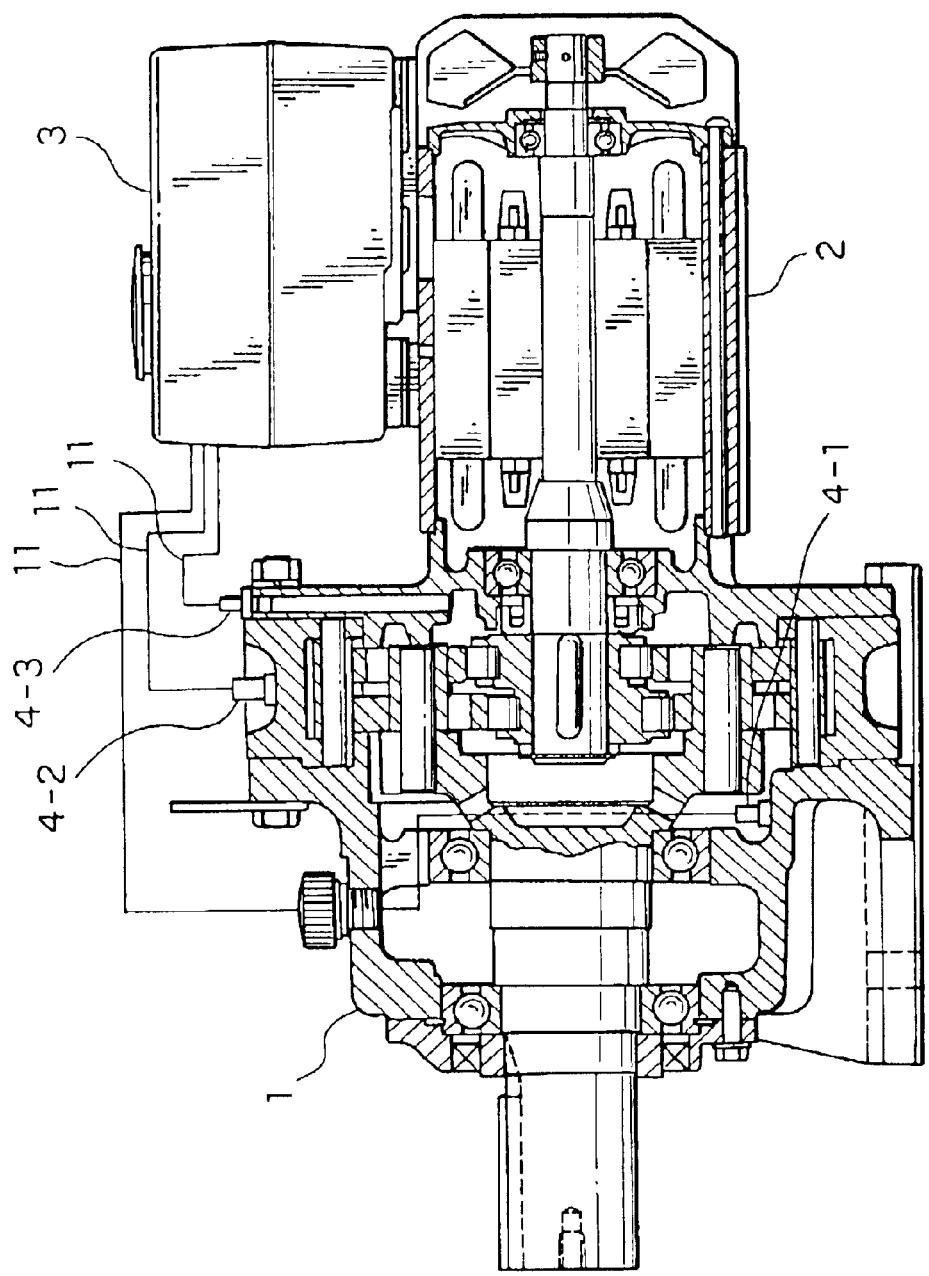
FIG. 4 is a sectional view illustrating an example where a plurality of sensors are mounted on a gear of the gear motor with the inverter shown in FIG. 2.

FIG. 4 illustrates an example where a temperature sensor 4-1 for detecting the temperature of the lubricant, a vibration sensor 4-2 for detecting the vibration of the gear section 1, and a pressure sensor 4-3 for detecting the pressure inside the gear section 1 are mounted on the gear section 1. Thus, these sensors collect the information about the gear section 1.

Figure 5:
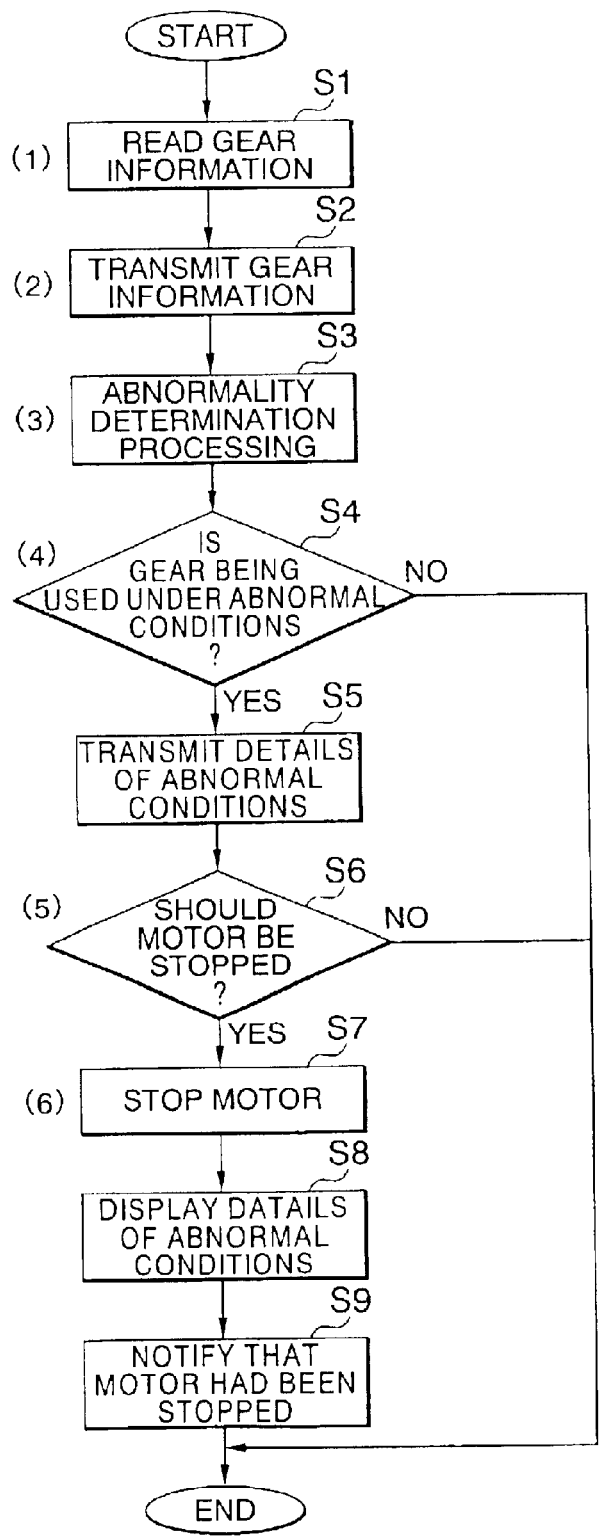
FIG. 5 is a flowchart illustrating operation performed by a CPU shown in FIG. 3 for processing information on the gear.

FIG. 5 illustrates the flow of gear-information processing that is performed inside the inverter 30. The flow of the gear-information processing performed by the CPU 32 is described below.

(1) The gear-information-processing unit 32-2 reads the gear information transmitted from the sensors 4 that are mounted on the gear section 1 (step S1).

(2) The read gear information is transmitted to the controller 8 (step S2).

(3) The gear-information-processing unit 32-2 determines whether or not the gear section 1 is under abnormal conditions based on the read gear information (step S3).

(4) When the gear-information-processing unit 32-2 determines that the gear section 1 is under abnormal conditions (step S4), it transmits the details of the abnormal conditions to the controller 8 (step S5).

(5) When the gear-information-processing unit 32-2 determines that the gear section 1 is under the abnormal conditions, it determines whether or not the motor 2 needs to be stopped (step S6).

The following is an example where the gear-information-processing unit 32-2 determines whether or not the gear section 1 is under abnormal conditions. First, for the gear information obtained from the sensors 4, two determination levels are set. One is an alarm level and the other is a stop level. When the level of the gear-information (hereinafter referred to as a gear-information level) is above the alarm level, only an alarm is issued without stopping the motor 2. When the gear-information level is above the stop level, the motor 2 is stopped.

Accordingly, the above-described operation can be performed when the gear-information level is determined to be too low, or too high.

FIG. 6 shows an example where the alarm level and the stop level are set for the three kinds of sensors 4-1 to 4-3 shown in FIG. 4. According to this setting, the above-described operation is performed when the gear-information level becomes too high. For example, when the gear information level indicating the pressure inside the gear section 1 is above 0.2 kgf/cm$^2$, an alarm is issued. When the pressure inside the gear section 1 is above 0.3 kgf/cm$^2$, the motor 2 is stopped.

(6) When the gear-information-processing unit 32-2 determines that the motor 2 needs to be stopped at step S6, it stops the motor 2 via the inverter-control unit 32-1 (step S7) and displays the details of the abnormal conditions on the display (not shown) of the inverter 30 (step S8). Further, the gear-information-processing unit 32-2 notifies the controller 8 that the motor 2 had been stopped due to the abnormality (step S9).

Figure 7:
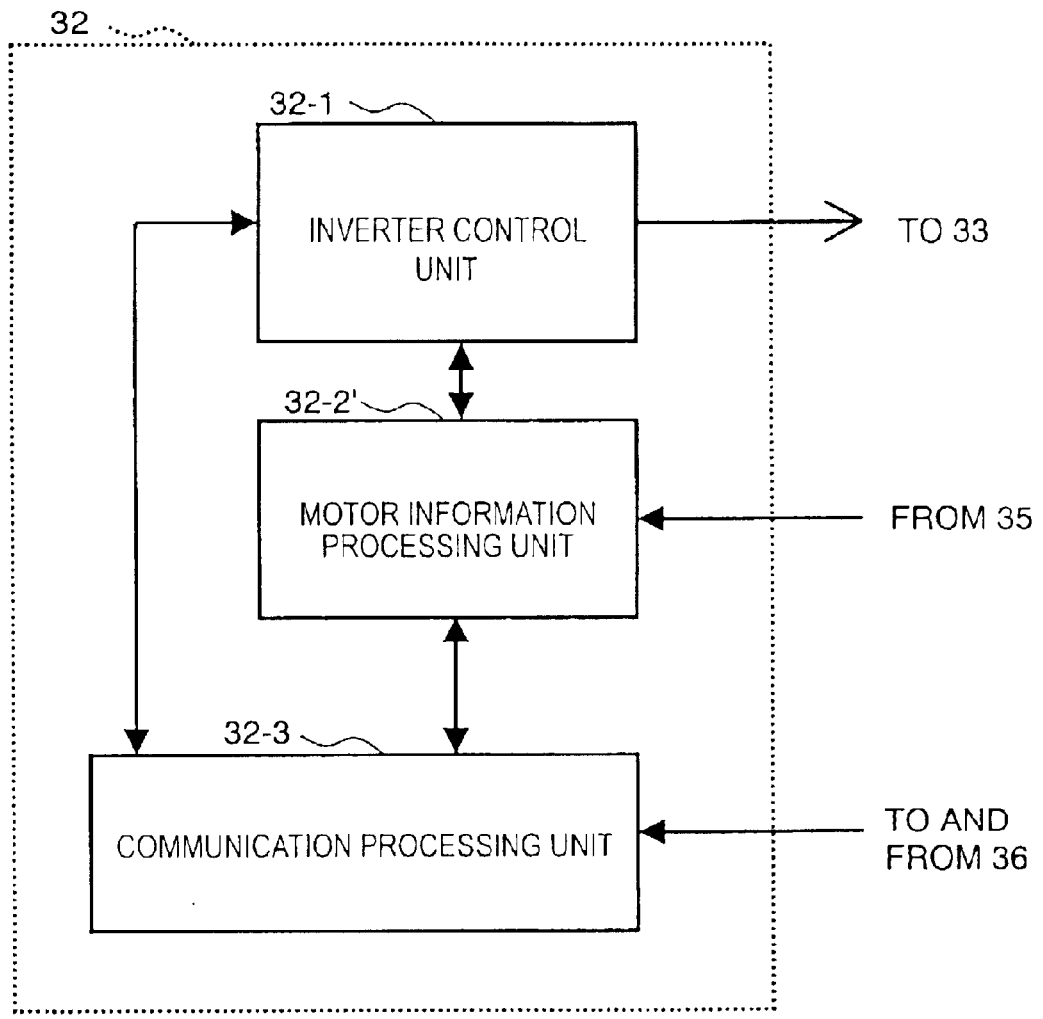
FIG. 7 illustrates the configuration of the CPU included in the inverter according to the present invention.

Thus, the gear motor with the inverter according to the preferred embodiments of the present invention has been described. However, the present invention can be applied to a generally used motor with an inverter without a gear. The configuration of such a motor is substantially the same as that shown in FIG. 4 except the gear section 1. That is to say, such a motor comprises the motor 2 and the inverter 3. In this case, the motor has a sensor (e.g., a temperature sensor to prevent an overload) mounted thereon instead of a sensor for controlling speed via the inverter (e.g., a rotation-speed sensor). The configuration of the CPU 32 of such a motor is shown in FIG. 7. The CPU 32 of this motor comprises an inverter-control unit 32-1 that is the same as that shown in FIG. 3, a motor-information-processing unit 32-2' that corresponds to the gear-information-processing unit 32-2 shown in FIG. 3, and a communication processing unit 32-3 that is the same as that shown in FIG. 3. The motor-information-processing unit 32-2' determines whether or not the motor is under abnormal conditions based on information transmitted form the temperature sensor. The flow of the processing is the same as that illustrated in the flowchart of FIG. 5.

That is to say, the motor-information-processing unit 32-2' reads motor information transmitted from the temperature sensor mounted on the motor 2 (step S1). Then, the motor-information-processing unit 32-2' transmits the read motor information to the controller 8 (step S2). Further, the motor-information-processing unit 32-2' determines whether or not the motor 2 is in abnormal conditions based on the read motor information (step S3).

When the motor-information-processing unit 32-2' determines that the motor 2 is in the abnormal conditions (step S4), it transmits the details of the abnormal conditions to the controller 8 (step S5).

When the motor-information-processing unit 32-2' determines that the motor 2 is under the abnormal conditions, it determines whether or not the motor 2 needs to be stopped (step S6).

The following is an example where the motor-information-processing unit 32-2' determines whether or not the motor 2 is under abnormal conditions. First, as has been described with referring to FIG. 3, two determination levels are set for the motor information obtained by the temperature sensor. One is an alarm level and the other is a stop level. When a motor-information level is above the alarm level, only an alarm is issued without stopping the motor 2. When the motor-information level is above the stop level, the motor 2 is stopped.

When the motor-information-processing unit 32-2' determines that the motor 2 needs to be stopped at the step S6, it stops the motor 2 via the inverter-control unit 32-1 (step S7) and displays the details of the abnormal conditions on the display (not shown) of the inverter 30 (step S8). Further, the motor-information-processing unit 32-2' notifies the controller 8 that the motor 2 had been stopped due to the abnormality (step S9).

According to the present invention, the following effects can be obtained.

1) Since the inverter includes the input-interface unit of the sensors that are mounted on the gear or the motor, the configuration and the wiring of the motor with the inverter can be simplified and reduced in size and cost.

2) At least one of the gear information and the motor information can be transmitted to the higher-order controller by using the communication circuit included in the inverter. Therefore, the configuration and the wiring of the motor with the inverter can be simplified and reduced in size and cost.

3) Since the inverter is mounted on the motor, the process of wiring for installing the motor with the inverter is simplified.

What is claimed is:

1. A gear motor with an inverter, comprising:

a motor;

a gear section for acceleration and deceleration, that is combined into the motor;

at least one sensor mounted on the gear section; and a communication device for communicating with a higher-order device, the inverter for performing speed control under the control of the higher-order device and coupled directly to the at least one sensor, and including a control unit for collecting information from the at least one sensor and performing predetermined processing using the collected information, wherein the control unit transmits at least one of the collected information and the processing result to the higher-order device via the communication device.

2. A gear motor with an inverter, comprising:

a motor;

a gear section for acceleration and deceleration, that is combined into the motor;

at least one sensor mounted on the gear section; and a communication device for communicating with a higher-order device, the inverter for performing speed control under the control of the higher-order device and including a control unit for collecting information from the at least one sensor and performing predetermined processing using the collected information, wherein the control unit transmits at least one of the collected information and the processing result to the higher-order device via the communication device, and wherein the control unit performs abnormality-determination processing as the predetermined processing for determining whether or not the gear section is being used under abnormal conditions based on the information transmitted from the at least one sensor.

3. A gear motor with an inverter according to claim 2, wherein, in addition to the abnormality determination, the control unit determines whether or not the motor needs to be stopped when the motor is being used under abnormal conditions and stops the motor when the control unit determines that the motor needs to be stopped.

4. A gear motor with an inverter according to claim 2, wherein the inverter is mounted on the motor.

5. A gear motor with an inverter according to claim 3, wherein the inverter is mounted on the motor.

6. A gear motor with an inverter according to claim 5, wherein the inverter comprises:
   an inverter main-circuit comprising a plurality of switching elements for performing an inverting operation;
   an inverter-drive circuit; and
   an interface unit for interconnecting the at least one sensor and the control unit,
   and wherein the control unit controls the switching elements via the inverter-drive circuit and the communication device is included in the inverter and interconnects the control unit and the higher-order device.

7. A gear motor with an inverter according to claim 6, wherein the control unit further comprises:
   an inverter-control unit for controlling the plurality of switching elements via the inverter-drive circuit;
   an information-processing unit, connected to the interface unit, for performing the predetermined processing by using the information from the at least one sensor; and
   a communication-processing unit, connected between the communication device, the inverter-control unit, and the information-processing unit, for transmitting and receiving information between the higher-order device, the inverter-control unit, and the information-processing unit.

8. A gear motor with an inverter according to claim 7, wherein the communication device and the higher-order device are interconnected by a realtime-system network.

9. A gear motor with an inverter according to claim 8, wherein the higher-order device is connected to the Internet via an information-system network.

10. A motor with an inverter, comprising:
   a communication device for communicating with a higher-order device; and
   at least one sensor mounted on the motor, the sensor provided to be used except for speed control,
   the inverter for performing speed control under the control of the higher-order device and coupled directly to the at least one sensor, and including a control unit for collecting information from the at least one sensor and performing predetermined processing by using the collected information,
   wherein the control unit transmits at least one of the collected information and the processing result to the higher-order device via the communication device.

11. A motor with an inverter, comprising:
   a communication device for communicating with a higher-order device; and
   at least one sensor mounted on the motor, the sensor provided to be used except for speed control,
   the inverter for performing speed control under the control of the higher-order device, and including a control unit for collecting information from the at least one sensor and performing predetermined processing by using the collected information,
   wherein the control unit transmits at least one of the collected information and the processing result to the higher-order device via the communication device, and
   wherein the control unit performs abnormality-determination processing as the predetermined processing for determining whether or not the motor is being used under abnormal conditions based on the information transmitted from the at least one sensor.

12. A motor with an inverter according to claim 11, wherein, in addition to the abnormality determination, the control unit determines whether or not the motor needs to be stopped when the motor is being used under abnormal conditions and stops the motor when the control unit determines that the motor needs to be stopped.

13. A motor with an inverter according to claim 11, wherein the inverter is mounted on the motor.

14. A motor with an inverter according to claim 12, wherein the inverter is mounted on the motor.

15. A motor with an inverter according to claim 14, wherein the inverter comprises:
   an inverter main-circuit comprising a plurality of switching elements for performing an inverting operation;
   an inverter-drive circuit; and
   an interface unit for interconnecting the at least one sensor and the control unit,
   and wherein the control unit controls the switching elements via the inverter-drive circuit and the communication device is included in the inverter and interconnects the control unit and the higher-order device.

16. A motor with an inverter according to claim 15, wherein the control unit further comprises:
   an inverter-control unit for controlling the plurality of switching elements via the inverter-drive circuit;
   an information-processing unit, connected to the interface unit, for performing the predetermined processing by using the information from the at least one sensor;
   a communication-processing unit, connected between the communication device, the inverter-control unit, and the information-processing unit, for transmitting and receiving information between the higher-order device, the inverter-control unit, and the information-processing unit.

17. A gear motor with an inverter according to claim 16, wherein the communication device and the higher-order device are interconnected by a real-time-system network.

18. A motor with an inverter according to claim 17, wherein the higher-order device is connected to the Internet via an information-system network.

19. A method for processing information in a gear motor, the method comprising:
   collecting information from at least one sensor in a gear motor;
   performing speed control for the gear motor using an inverter mounted on the gear motor;
   performing predetermined processing using the collected information in an inventor coupled to the at least one sensor; and
   transmitting at least one of the collected information and processing result to a higher-order device.

* * * * *